United States Patent Office 3,025,149
Patented Mar. 13, 1962

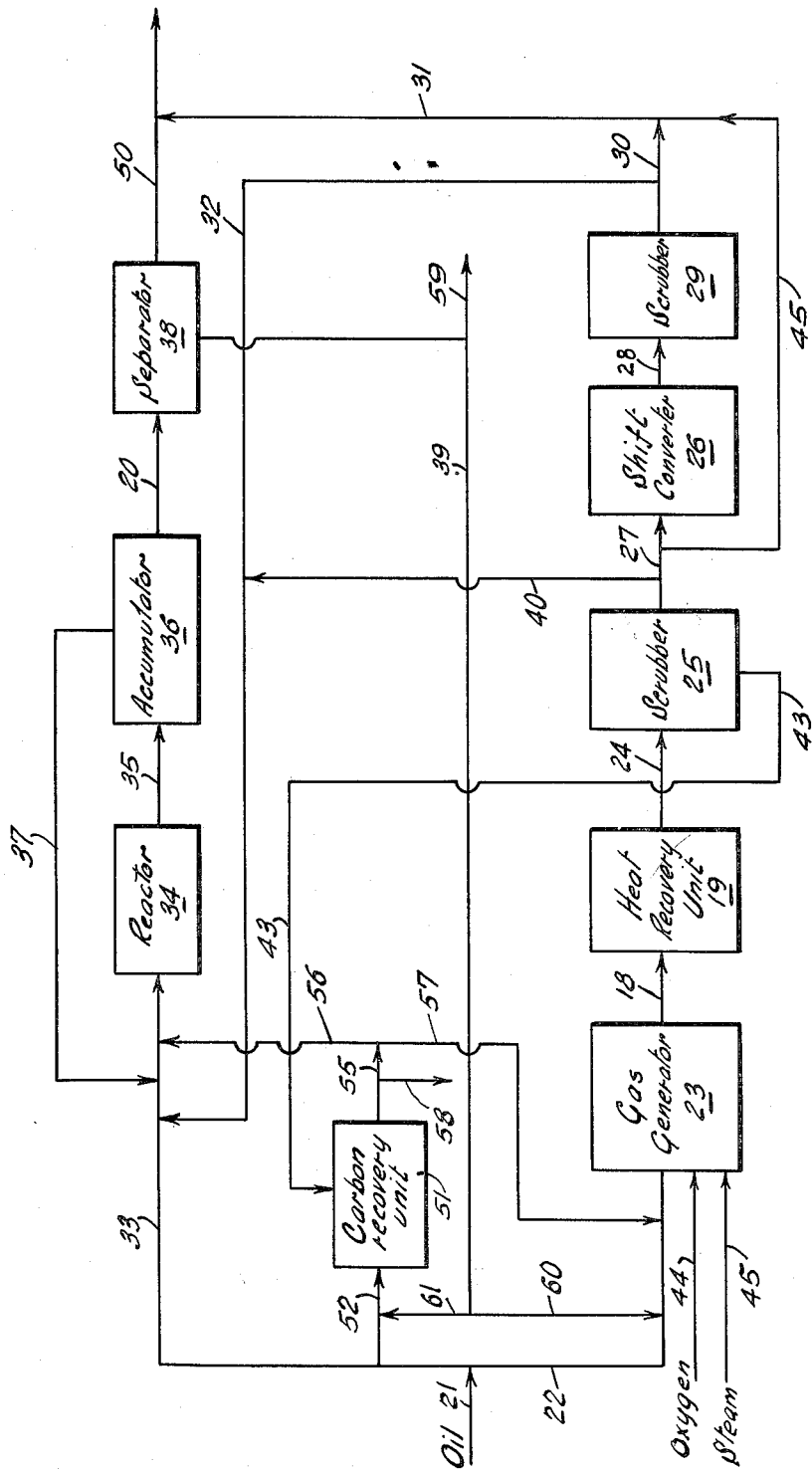

3,025,149
PRODUCTION OF HEATING GAS
Du Bois Eastman, Whittier, Calif., assignor to Texaco Inc., a corporation of Delaware
Filed June 5, 1958, Ser. No. 740,005
6 Claims. (Cl. 48—197)

This invention relates to a hydrocarbon conversion process. More particularly, it relates to a method for the conversion of a liquid hydrocarbon into valuable products as, for example, heating gas.

The process according to the present invention comprises contacting the liquid hydrocarbon at elevated temperatures and superatmospheric pressures with hydrogen, separating the reaction product into a gaseous portion and a liquid portion, converting the liquid portion to a gas comprising hydrogen by partial combustion with oxygen and utilizing the hydrogen so produced for the hydrogenation of the liquid hydrocarbon.

Any liquid hydrocarbon may be satisfactorily converted by the process of the present invention. Such materials as vacuum residuum, kerosene, straight run gas oil, thermally cracked gas oil, fluid catalytically cracked cycle gas oil, whole crude, shale oil, tar sand oil and the like are suitable feed stocks for the process of the present invention.

In one embodiment of the present invention, the flow of materials in the reaction zone is maintained under conditions of turbulent flow high enough to effect the apolymeric hydroconversion of the liquid hydrocarbon. These conditions may be obtained by flowing the reactants as a confined stream at high velocities through a coil or tubular conduit. By so doing the hydrogen is brought into intimate contact with the hydrocarbon thereby, in effect, allowing greater solution or diffusion of the hydrogen into the hydrocarbon. As a result, when the hydrocarbon molecule is cracked there is sufficient hydrogen present at the site of the cracking reaction to react with the active fragments formed by the cracking before the active fragments can inter-react to form high polymers. In addition, because of the intimate mixture produced by the highly turbulent flow, the consumed hydrogen is immediately replaced by additional hydrogen at the site of the reaction so that there is no local depletion of hydrogen in the reaction zone. In other words, under the conditions of highly turbulent flow hydrogen is always present throughout the reaction zone in sufficient amounts to prevent the formation of high polymers and coke.

When lighter hydrocarbon liquids are used as the feed the reaction temperature may be above the critical temperature of the hydrocarbon and the lighter hydrocarbons may be vaporized under reaction conditions. When the feed stock is a heavy oil in some cases it or a portion thereof remains in the liquid state under reaction conditions and as a result two phases, namely hydrocarbon liquid and the hydrogenating gas are present in the reaction zone.

When a liquid and a gas flow through the same conduit, it is possible to have several types of flow. These types of flow are described by Baker in the Oil and Gas Journal, July 26, 1954, page 185 et seq. and are designated as stratified, plug, slug, annular, bubble or froth and dispersed or spray types of flow. To effect the apolymeric hydroconversion in a system having a two phase flow, the bubble or froth or the dispsersed or spray types of flow are employed.

Hydrocarbon feed rate, hydrogen recycle rate, reaction coil diameter, and operating conditions of temperature and pressure all tend to affect velocity of flow and turbulence. It has been found convenient to express turbulence in terms of the ratio of the average apparent viscosity of the flowing stream, $\bar{\epsilon}m$, to the molecular or kinematic viscosity $\nu$, vis. $\bar{\epsilon}m/\nu$. Hereinafter, this ratio, $\bar{\epsilon}m/\nu$ is referred to as turbulence level. The apparent viscosity of the flowing stream, $\epsilon m$, equals the sum of the eddy viscosity, $em$ and the kinematic viscosity $\nu$, which may be shown by the expression $\epsilon m = em + \nu$. Under conditions of turbulence, $em$ has a finite value and it is apparent that if the magnitude of the apparent viscosity exceeds the kinematic viscosity at the point in question the ratio of $\epsilon m/\nu$ exceeds unity. For a given turbulent system, it follows that the average value of the ratio, as expressed by $\bar{\epsilon}m/\nu$ exceeds unity. The average apparent viscosity, $\bar{\epsilon}m$ as employed herein is defined by the equation $$\bar{\epsilon}m = \frac{1}{r_0}\int_0^{r_0} \epsilon m \, dr$$

where $r_0$ is the radius of the conduit. By substitution and integration, employing the parameters described by Corcoran et al., in Industrial and Engineering Chemistry, volume 44, page 410 (1952), this expression $$\bar{\epsilon}m = \frac{1}{r_0}\int_0^{r_0} \epsilon m \, dr$$

may be rewritten $$\bar{\epsilon}m = \frac{r_0}{15}\sqrt{\frac{r_0 g}{2\sigma}\cdot\frac{dp}{dx}}$$

The latter equation is in terms which may be readily determined for a given system.

NOMENCLATURE $d$ = differential
$g$ = acceleration of gravity, feet per second$^2$
$p$ = pressure, pounds per square foot
$r_0$ = radius of conduit, feet
$x$ = distance, feet
$em$ = eddy viscosity, square feet per second
$\epsilon m$ = apparent viscosity, square feet per second
$\bar{\epsilon}m$ = average apparent viscosity, square feet per second
$\nu$ = kinematic viscosity, square feet per second
$\sigma$ = specific weight, pounds per cubic foot Turbulence levels above 25 may be employed but turbulence levels of 50 to 1000 are preferable. Temperatures of 850 to 1600° F. may be employed. A preferred range of temperatures is from 950 to 1100° F. Pressures in excess of 1000 p.s.i.g. may be employed although pressures of 3000 to 10,000 p.s.i.g. are preferred. However, when the hydrocarbon feed is in the gasoline boiling range, pressures in excess of 750 p.s.i.g., preferably above 1000 p.s.i.g. may be used. It is desirable for the hydrogenation gas to have a high hydrogen concentration but hydrogen concentrations as low as 25 volume percent may be used. Hydrogenating gas rates of at least 1000 cubic feet per barrel of feed are employed and rates up to 100,000 cubic feet per barrel of feed may be used. Although reaction times of from one second to two hours may be employed, reaction times of 20 to 200 seconds are preferred.

The reaction product is separated into a normally-gaseous portion and a portion containing substantially all of the liquid material present in the product. The gaseous portion is sent to product storage and the liquid portion is converted, by partial combustion, into a gas containing hydrogen. Generally, any metals present in the original feed are concentrated in the liquid portion withdrawn from the separator and since mineral ash-forming constituents are detrimental to the life of the refractory lining of the gas generator the gasification of the liquid portion is conducted under controlled conditions of conversion.

The liquid portion is introduced into the reaction zone of the gas generator together with sufficient free oxygen to react exothermically with the feed to autogenously maintain a temperature in the range of about 2200° F. to about 3200° F. and to convert not less than about 90 percent and not more than 99.5 percent of the carbon contained in the feed to carbon oxides. The extent of conversion of the carbon may be varied within this range depending upon the amounts of heavy metals contained in the feed. The quantity of unconverted carbon should be at least 50 times and preferably 100 times the combined weights of the nickel and vanadium contained in the feed on the basis of the weight of the metal content of the metal-containing constituents present in the feed. The unconverted carbon from the hydrocarbon is liberated as free carbon. Under these conditions of limited carbon conversion, the ash-forming constituents of the feed, particularly the ash resulting from the heavy metal constituents, are associated with the carbon and the composite is liberated as carbonaceous solid in particle form. The carbonaceous solid particles containing the heavy metals are substantially harmless to the refractory lining of the gas generator.

More specifically, the liquid feed containing mineral ash-forming constituents including nickel and vanadium is admixed with steam and fed into a compact, unpacked reaction zone. The reaction zone is free from packing and catalyst and has an internal surface area of not more than 1.5 times the surface of a sphere equal in volume to the volume of the reaction zone. An oxygen-rich gas containing about 95 percent oxygen by volume is introduced into the reaction zone into intimate admixture with the feed and steam. The generator may be operated at atmospheric or superatmospheric pressure. Preferably the generator is operated at a pressure within the range of from about 100 to about 600 pounds per square inch gauge. The temperature within the gas generator is autogenously maintained preferably within the range of 2500 to 2900° F.

The quantity of free oxygen supplied to the gas generator is limited so that the conversion of carbon to carbon oxides is limited to 90 to 99.5 percent of the carbon content of the oil fed to the gas generator. From about 1.8 to about 1.9 mols of free oxygen are supplied to the gas generator for each million B.t.u.'s gross heating value of the feed to the gas generator.

The amount of unconverted carbon released as a carbonaceous solid in the generator should be at least 50 times by weight the combined weights of the metals including nickel and vanadium contained in the feed, based on the weight of the free metal content of the metal-containing compounds in the feed. Free carbon released in the gas generator is entrained in the gaseous products of reaction. Ash from the fuel, particularly the heavy metal constituents, is substantially completely retained in the carbonaceous residue. The hot gases from the generator containing entrained carbon may be subjected to a preliminary cooling by indirect heat exchange and then are contacted with water in a gas scrubbing operation in which the gases are cooled to a temperature below the reaction temperature. The carbonaceous solid is removed from the gas stream in the scrubbing operation.

The carbonaceous solid may be discarded or, if desired, can be recovered by contacting the solid-water slurry with a liquid hydrocarbon, preferably a portion of the hydrocarbon feed to the hydrogenation unit or a portion of the feed to the partial combustion unit depending on the ultimate destination of the solid. When the solid-water slurry is mixed with the hydrocarbon, the carbonaceous solid is preferentially wet by the hydrocarbon and is transferred thereinto to form a carbon-hydrocarbon slurry which can be sent either to the hydrogenation unit or to the partial combustion unit.

To produce a hydrogen-rich gas, the gaseous products from the partial combustion are cooled to a temperature of about 230–240° F. and are mixed with steam to provide a 4 or 5 to 1 water to CO ratio. The mixture is passed over an iron oxide catalyst in a reactor containing three intercooled beds. The mixture is introduced into the reactor at a temperature of about 700° F. In the first bed the temperature rises to about 850° F. The gases are then cooled to a temperature of about 720° F. prior to passage through a second bed wherein a temperature rise of about 30° F. is effected. The gases are then cooled to a temperature of about 680 to 700° F. before introduction into the third bed where very little temperature rise occurs. The gases are then cooled to 100° F. to allow the water to separate out and are then passed through an amine scrubber in which the $CO_2$ is absorbed. The scrubbed gas has a hydrogen content of about 95 volume percent. A portion, or all of this gas, if necessary, is then recycled to the hydrogenation step. The balance, if any, is combined with the gaseous product of the hydrogenation step. If desired, only sufficient gas from the partial combustion is shifted to satisfy the hydrogen requirements of the hydrogenation reaction and the balance is sent to product gas storage.

The invention may be more easily understood by reference to the accompanying drawing which represents diagrammatically a flow scheme for the practice of the present invention.

Oil from an external source (not shown) is introduced through lines 21 and 22 to gas generator 23 whereby reaction with oxygen introduced through line 44 and steam introduced through line 45 it is converted to a gaseous mixture composed for the most part of carbon monoxide and hydrogen. The gaseous mixture leaves generator 23 through line 18 and is partially cooled in heat recovery unit 19 by indirect heat exchange with, for example, water for the production of steam or with reactant feed to either the hydrogenation reactor or the gas generator to preheat the reactant. The gas then leaves heat recovery unit 19 through line 24 and is contacted with water in scrubber 25. The scrubbing cools the gaseous mixture to a temperature of about 230–250° F. and also effects removal of entrained carbon particles which are carried off in the water stream. The scrubbed gaseous mixture is then introduced into shift converter 26 through line 27 where it is contacted with a shift catalyst such as iron oxide in the presence of steam in an amount sufficient to provide a 4 or 5 to 1 water to CO ratio. The shift converter 26 is operated at a temperature of from about 700 to 850° F. The gaseous mixture from shift converter 26 is passed through line 28 to amine scrubber 29 where the $CO_2$ is removed. The gas leaves scrubber 29 through line 30. A portion of the scrubbed gas may be removed through lines 31 and 50 and sent to product storage. A separate portion or all, if desired, of the scrubbed gas is sent through lines 30 and 32, and together with oil feed from line 33 is introduced into reactor 34 where the oil is subjected to reaction conditions in the presence of hydrogen. Effluent from reactor 34 passes through line 35 to accumulator 36 where hydrogen may be removed and recycled to reactor 34 through lines 37 and 33. The hydrocarbon-containing stream is then fed through line 20 to separator 38 where a separation of liquid hydrocarbons from gases is made. The gaseous product is sent to product storage through line 50. Liquid product is removed from separator 38 and transferred to gas generation zone 23 through lines 39, 60 and 22. At this point, if the liquid product can satisfy the hydrogen requirements of the hydrogenation reactor, it is, in some instances, desirable to discontinue the flow of oil to gas generator 23 through lines 21 and 22.

Optionally the gas from scrubber 25 may be sent directly to hydrogenation zone 34 through lines 27, 40, 32 and 33 or from scrubber 29 through lines 30, 32, and 33. In this event it may be desirable to pass the hydrogenating gas on a "once through" basis through hydrogenation zone 34 without recycle of any hydrogen-containing gas from accumulator 36. However, if recycle is desired, it may be advantageous to remove carbon monoxide from the recycle hydrogenation gas to prevent the build-up of carbon oxides in the system.

When it is desired to take advantage of the catalytic effect of the metals sequestered in the carbon entrained from gas generation zone 23, the carbon and entrained metals are passed from scrubber 25 as a water slurry through line 43 to carbon recovery unit 51 where the slurry is contacted with a portion of the oil feed introduced through line 52. The carbon which has a greater affinity for the oil than for the water is removed as a carbon-oil slurry through lines 55, 56 and 33 to hydrogenation reactor 34. The carbon-oil slurry may also be returned to gas generator 23 through lines 55, 57 and 22, for gasification, in which case it is preferable to extract the carbon with unconverted hydrocarbon introduced into carbon recovery unit 51 from separator 38 through lines 39, 61 and 52. Draw-offs 58 and 59 are provided in lines 55 and 39 respectively, so that, if desired, liquid hydroconversion product or carbon-hydrocarbon slurry may be withdrawn from the system and used, for example, for fuel.

If desired, unshifted gas may be sent directly to product gas storage from scrubber 25 through lines 27, 31 and 50, and to subject to shift conversion only that portion of the gas to be sent to the hydrogenation reactor.

The following examples are given for illustrative purposes only:

*Example I*

This example illustrates the production of approximately 200,000,000 cubic feet per day of 500 B.t.u. gas A 38.1 API gravity diesel fuel having the following characteristics.

Hydrocarbon type analysis:

| | | |
|---|---|---|
| Saturates | percent | 74.19 |
| Olefins | do | 3.25 |
| Aromatics | do | 22.56 |

Distillation range:

| | | |
|---|---|---|
| IBP | °F | 410 |
| 10% | °F | 457 |
| 20% | °F | 474 |
| 50% | °F | 519 |
| 80% | °F | 578 |
| 90% | °F | 608 |
| 95% | °F | 628 |
| End point | °F | 655 |
| Recovery | percent | 98.5 |
| Residue | do | 1.5 | is introduced into the system at a rate of 807.7 bbls. per hour. Of this amount 259.2 bbls. per hour, together with 231.3 bbls. per hour of liquid bottoms from the hydrogenation zone (as is explained below) is introduced into a gas generator, maintained at a temperature of about 2550° F. and a pressure of about 400 p.s.i.g., with 1,952,190 cubic feet of oxygen per hour and 686,700 lbs. of steam per hour. The effluent from the gas generator, after preliminary cooling by indirect heat exchange with water to produce steam is scrubbed with water and is passed with sufficient steam to give a 4 or 5 to 1 water to CO ratio to a shift converter. The product gas after cooling and $CO_2$ removal has the following analysis:

| | Vol. percent |
|---|---|
| $H_2$ | 94.2 |
| CO | 3.9 |
| $CO_2$ | 0.1 |
| $N_2$ | 0.6 |
| $CH_4$ | 1.2 | and is produced at the rate of about 7,514,050 cubic feet per hour. Of this amount 6,692,490 cubic feet per hour is sent to product storage and 821,560 cubic feet per hour is introduced together with 548.5 bbls. per hour of fresh feed into a tubular reactor maintained at an average temperature of 1035° F., an average pressure of 4480 p.s.i.g. and at a turbulence level as indicated by the ratio $\bar{\epsilon}m/\nu$ of about 130. The product is separated into a gaseous portion and a liquid portion. The liquid portion which amounts to 231.3 bbls. per hour is fed to the gas generator as indicated above. The gaseous portion which is produced at a rate of 1,629,700 cubic feet per hour has the following composition:

| | Vol. percent |
|---|---|
| $H_2$ | 41.19 |
| CO | 3.35 |
| $CO_2$ | 0.23 |
| $N_2$ | 0.58 |
| $CH_4$ | 18.60 |
| $C_2H_6$ | 13.49 |
| $C_3H_6$ | 1.19 |
| $C_3H_8$ | 13.81 |
| $C_4H_8$ | 1.21 |
| $C_4H_{10}$ | 6.35 |

This gas is combined with the 6,692,490 cubic feet per hour of gaseous product from the shift converter to produce a gas having a heating value of 500 B.t.u. per cubic foot.

Obviously, many modifications and variations of the invention, as hereinbefore set forth, may be made without departing from the spirit and scope thereof, and therefore only such limitations should be imposed as are indicated in the appended claims.

I claim:

1. A process for the production of a heating gas which comprises passing a liquid hydrocarbon containing ash-forming impurities through a tubular hydrogenation zone with hydrogen at a pressure between about 3000 and 10,000 p.s.i.g. and a temperature between about 950 to 1100° F. under conditions of turbulent flow at a turbulence level of at least 25 to convert a portion thereof to a gas of high heating value, separating the reaction product into a liquid portion and a gaseous portion, subjecting at least a portion of the separated liquid portion to partial combustion with a free oxygen-containing gas to produce a gas containing hydrogen, the amount of free oxygen being sufficient to convert not less than about 90% and not more than 99.5% of the carbon content of the liquid portion to carbon oxides, the weight of solid unconverted carbon being at least 50 times the combined weight of the metals contained in said liquid portion, recovering the unconverted carbon together with any sequestered metallic constituents contained therein from the products of the partial combustion reaction, returning same to the hydrogenation zone and utilizing the hydrogen produced by the partial combustion for the hydrogenation of liquid hydrocarbon feed.

2. A process for the production of a heating gas from a hydrocarbon liquid containing ash-forming impurities which comprises forming a mixture of hydrogen and said hydrocarbon liquid, passing the mixture as a confined stream through a tubular hydrogenation reaction zone at a turbulence level as represented by the ratio $\bar{\epsilon}m/\nu$ of at least 25 at a temperature between about 950 and 1100° F. and a pressure in excess of 750 p.s.i.g. to convert a portion of said hydrocarbon liquid to a gas of high heating value, separating the reaction product into a liquid hydrocarbon portion and a gaseous hydrocarbon portion, subjecting the liquid hydrocarbon portion to partial combustion with a free oxygen containing gas to produce a gas containing hydrogen and carbon monoxide, the amount of free oxygen being sufficient to convert not less than 90% and not more than 99.5% of the carbon content of the liquid portion to carbon oxides, scrubbing the effluent stream from the partial combustion zone with water to extract carbonaceous solids therefrom, passing the scrubbed gaseous stream with entrained $H_2O$ to a water gas shift conversion zone wherein a water gas shift is effected to produce a gas rich in hydrogen, returning at least a portion of the gas rich in hydrogen to the hydrogenation zone, contacting the scrubbing water containing carbonaceous solids with a hydrocarbon liquid to extract the carbonaceous material from the scrubbing water and introducing the hydrocarbon liquid containing extracted carbonaceous material into the hydrogenation zone.

3. A process for the production of a heating gas from a hydrocarbon liquid containing ash-forming impurities which comprises forming a mixture of hydrogen and said hydrocarbon liquid, passing the mixture as a confined stream through a tubular hydrogenation zone under conditions of turbulent flow at a temperature between 850 and 1600° F. and a pressure between 750 and 10,000 p.s.i.g. to convert a portion of said hydrocarbon liquid to a gas of high heating value, separating the reaction product into a liquid hydrocarbon portion and a gaseous hydrocarbon portion, subjecting the liquid portion to partial combustion with a free oxygen-containing gas to produce a gas containing hydrogen and carbon monoxide, recovering unconverted solid carbon together with any sequestered metallic constituents contained therein from the products of the partial combustion reaction, returning same to the hydrogenation zone and returning at least a portion of the hydrogen produced by the partial combustion to the hydrogenation zone.

4. The process of claim 3 in which the unconverted solid carbon is recovered from the products of the partial combustion reaction by contacting the stream of partial combustion products with water to extract carbonaceous solids therefrom, removing the unconverted carbon from the scrubbing water by contacting the water with a hydrocarbon liquid and introducing the hydrocarbon liquid containing unconverted solid carbon into the hydrogenation zone.

5. The process of claim 3 in which the turbulence level is at least 25.

6. The process of claim 3 in which the temperature is between about 950 and 1100° F.

References Cited in the file of this patent

UNITED STATES PATENTS

| | | |
|---|---|---|
| 1,888,998 | Mercier | Nov. 29, 1932 |
| 2,639,982 | Kalbach | May 26, 1953 |
| 2,789,094 | Eastman | Apr. 16, 1957 |
| 2,867,508 | Wood et al. | Jan. 6, 1959 |